United States Patent [19]

Beaty et al.

[11] Patent Number: 4,955,226
[45] Date of Patent: Sep. 11, 1990

[54] METHOD AND APPARATUS FOR AUTOMATICALLY DETECTING THE PRESENCE OF HOLES IN FILLED AND SEALED PACKED PLASTIC BAGS

[75] Inventors: Dennis W. Beaty, Arlington; C. Brooks Shafer, Dallas, both of Tex.

[73] Assignee: Frito-Lay, Inc., Dallas, Tex.

[21] Appl. No.: 686,549

[22] Filed: Dec. 26, 1984

[51] Int. Cl.$^5$ .............................................. G01M 3/36
[52] U.S. Cl. ........................................ 73/49.3; 73/52
[58] Field of Search .................. 73/49.3, 49.2, 49.4, 73/45.4, 52

[56] References Cited

U.S. PATENT DOCUMENTS

| | | | |
|---|---|---|---|
| 3,751,972 | 8/1973 | Hass | 73/45.4 |
| 3,805,595 | 4/1974 | Dobry | 73/49.3 |
| 3,918,293 | 11/1975 | Feigel | 73/49.3 |
| 3,998,091 | 12/1976 | Paquette et al. | 73/49.3 |
| 4,024,956 | 5/1977 | Cassidy | 73/49.3 |
| 4,148,213 | 4/1979 | Prakken | 73/45.4 |
| 4,517,827 | 5/1985 | Topscott | 73/49.3 |

FOREIGN PATENT DOCUMENTS 2059381 4/1981 United Kingdom .
2113406 8/1983 United Kingdom .
2138150 10/1984 United Kingdom .

Primary Examiner—Hezron E. Williams
Attorney, Agent, or Firm—Bernard, Rothwell & Brown

[57] ABSTRACT

A method and apparatus can automatically detect the presence of leaks in sealed plastic bags filled with product and gas by detecting the amount of displacement and the variation in displacement over time of a displacement transducer movable into contact with a fluffed bag, and utilizing the variation of displacement over time to detect such leaks. The variation of displacement over time is compared to the variation (or lack thereof) observed in a control bag without appreciable leaks, and a sufficient difference therebetween indicates a bag with a leak, which is thereafter rejected.

3 Claims, 2 Drawing Sheets

FIG. 1
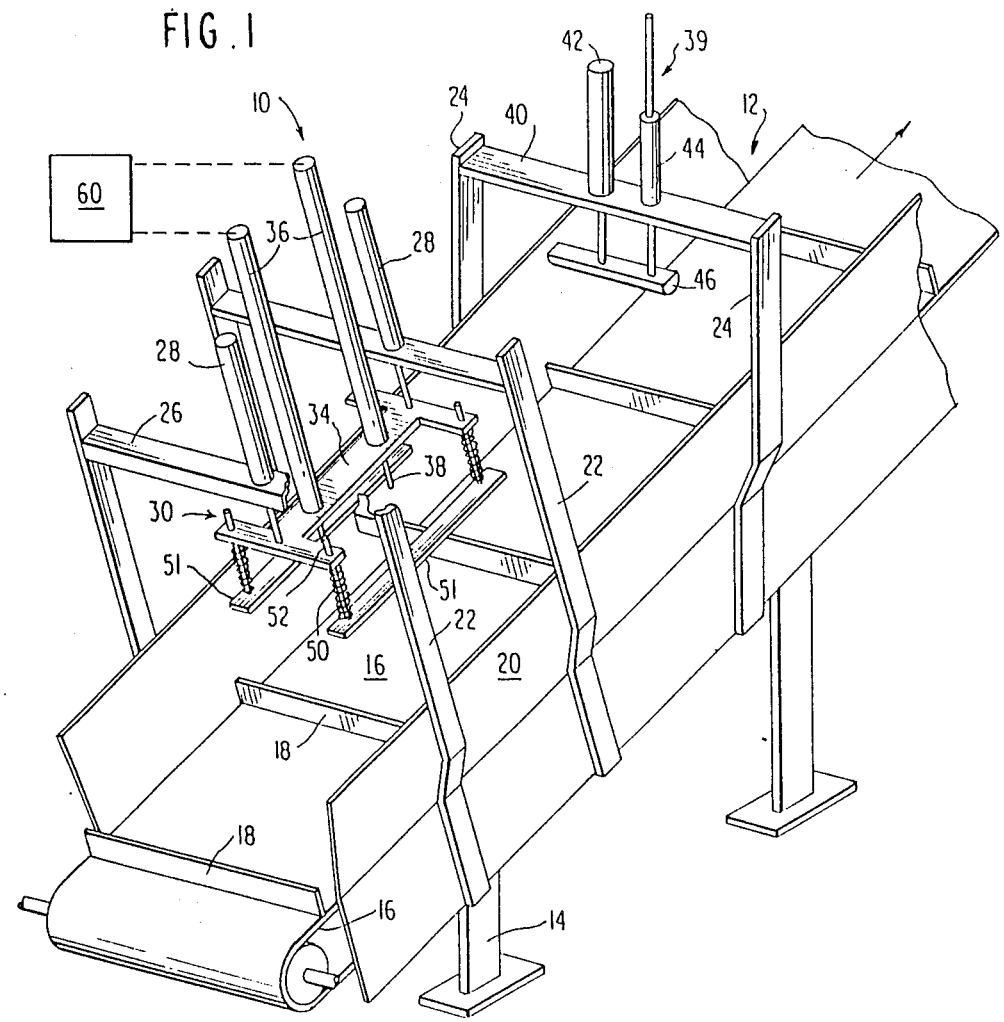
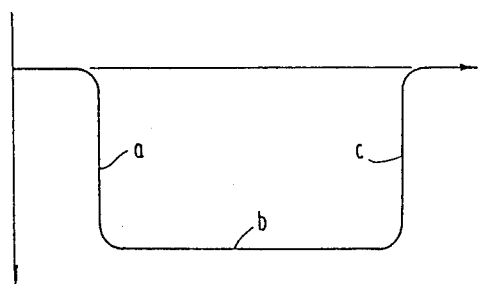
FIG. 2A
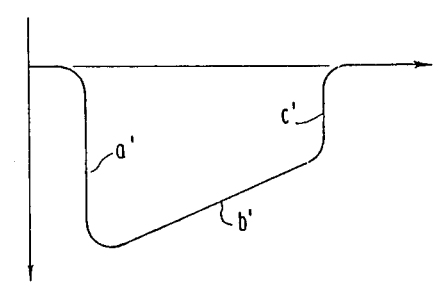
FIG. 2B

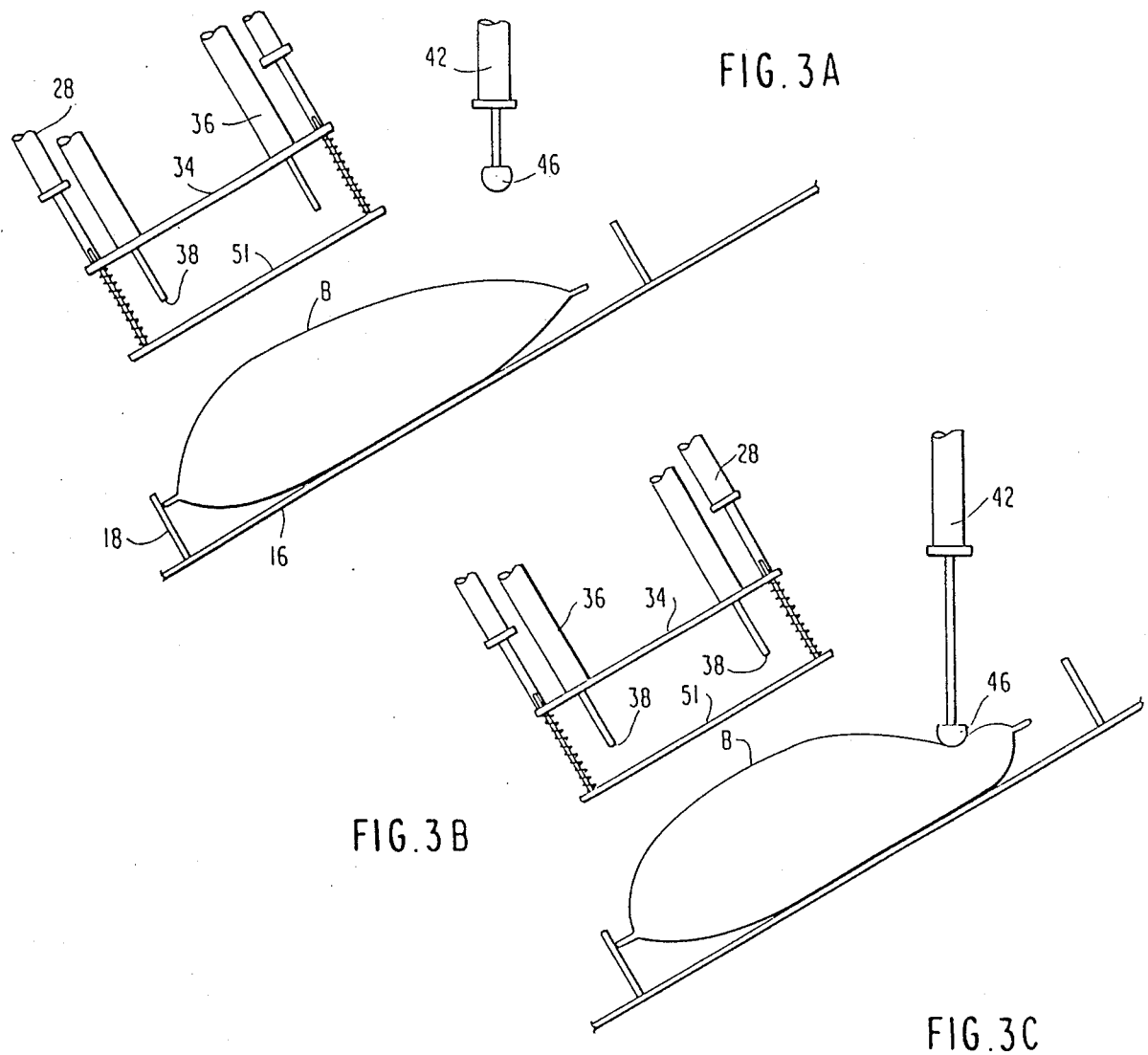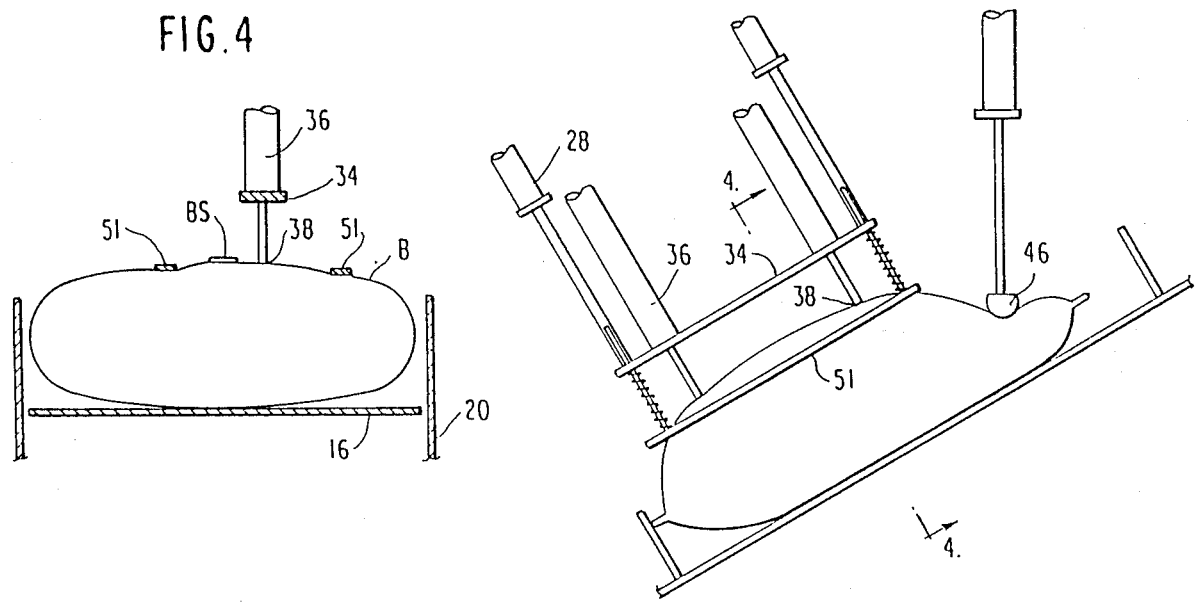

METHOD AND APPARATUS FOR AUTOMATICALLY DETECTING THE PRESENCE OF HOLES IN FILLED AND SEALED PACKED PLASTIC BAGS

BACKGROUND OF THE INVENTION

1. Field of the Invention

This invention relates to improvements in methods and apparatus for automatically detecting the presence of holes in filled and sealed packed plastic bags of the type containing a product and a gas.

2. Prior Art

Filled and sealed plastic bags containing product and a gas, for example, potato chip or other snack food packages, must not contain holes in them. If such bags contain holes, product can leak from the bag and air in large quantities can get into the bag and affect the product. Therefore, such bags having holes in them are defective and even though filled with product, must be removed after packing and prevented from entering the stream of distribution.

At present, filled and sealed packed plastic bags of snack food products are individually and manually inspected for holes and other defects at the time they are packed into a case or carton containing multiple bags. Obviously if one of the bags in the case leaks, it causes problems for the whole case of product as it enters the chain of distribution.

While manual inspection during manual packing of bags in cases is usually quite satisfactory, it has the disadvantage of all manual operations in that it depends on humans, and humans err. Moreover, there is presently a trend toward automating the case packing operation so as to eliminate the previous manual operation of packing the case. The workers who previously packed the case were the same ones who simultaneously inspected the bag for holes. Consequently, if cases were packed by automation, the workers would not be present to detect holes in the bag and many more bags with holes in them would likely enter the stream of distribution.

Many of the holes in the bags are not in the face of the bags, but are in the seams or seals and may be due to defective seals which occur in making and filling the bag, rather than defective plastic film from which the bag is made or tearing of the film. Nevertheless, no matter what the cause of the hole in the bag, there is and has been for some time a need in the art for an automatic means and method for detecting holes in bags.

There is a machine which attempts to measure leakage in small sealed plastic bags containing product and a gas. In such construction the bag is precisely positioned on an inspection table and goes through five or six stations where at each station a weighted member is dropped on the bag to be tested in order to force air out of any leaks in the bag without bursting the bag. The weights may be in the form of a "bed of nails." This device, however, is not completely satisfactory for several reasons. If a bag has more air or air pressure than usual, even the multi-station testing does not force enough air out of the bag when the bag has a leak. An optical arrangement is used for measuring at the end of the stations. In addition to other problems mentioned above, the known prior art is complex, wasteful of space, and subject to inaccuracies. Moreover, it cannot measure the rate of leakage and therefore is dependent on each bag having the same amount of air in it, something that does not occur in usual production lines.

It is particularly difficult to detect a hole in a filled and sealed plastic bag containing gas and a product such as potato chips and the like, other than doing it manually, because of the nature of the bag. That is, the gas in the bag is not under high pressure. The gas is usually air and gas detection methods are not appropriate. Because of significant graphics on the bag and because possible holes are in the seams, optical detection methods are not appropriate. It appears that there was no solution to this longstanding problem prior to the present invention.

SUMMARY OF THE INVENTION

The method and apparatus of this invention provides for automatically detecting the presence of holes in a filled and sealed packed plastic bag containing product and gas prior to case packing of the bag and includes pressing inwardly on a surface of a filled and sealed bag for a particular distance, holding the depressed position for a predetermined period and measuring the amount of displacement of the bag surface pressed inwardly during the time of holding to determine any variation in the displacement during the holding period and utilizing such variation to determine if there is a leak in the bag. The apparatus for accomplishing this method includes a bag-pressing assembly containing a frame which mounts displacement transducer means for determining movement of the filled bag after the frame has moved the transducer means a predetermined distance to depress the surface of the bag. While the frame holds the displacement transducer in a bag-depressing position measurements are taken over a predetermined period of time to detect if there is movement of the bag which would be due to leaks to reject leaky bags.

BRIEF DESCRIPTION OF THE DRAWINGS

FIG. 1 is a perspective view of the apparatus of this invention.

FIGS. 2A and 2B are diagramatic views of wave forms illustrating the principles used in the method of this invention.

FIGS. 3A, 3B and 3C are diagramatic side elevation views illustrating the mechanical steps involved in the method of this invention.

FIG. 4 is a sectional view taken along line 4—4 of FIG. 3C.

DETAILED DESCRIPTION OF THE PREFERRED EMBODIMENT

A leak-detecting apparatus 10 for automatically detecting the presence of holes in sealed bags B which are filled with a product and a gas, e.g., large filled plastic bags B of potato chips, includes a conveyor assembly 12 supported on supports 14 so that the conveyor is positioned in an inclined position moving upwardly from the left to right as viewed in FIG. 1. The bags B are made from plastic film and automatically sealed at the time they are formed and filled. Atmospheric air is trapped in the bag during sealing and this provides some cushion for the fragile contents.

The conveyor assembly 12 includes a conveyor belt 16 trained around conventional pulleys with a conventional drive, the belt being driven in a step-by-step manner to position bags one at a time under the leak-detecting apparatus 10. The belt has a plurality of flights 18 positioned across the surface of the belt. The space on the belt 16 between adjacent flights is sufficient to handle a bag being tested as shown for example in FIGS. 3A, 3B, 3C and 4.

The conveyor may conveniently have sides 20 with support posts 22 and 24 extending above the conveyor for supporting the leak-detecting assembly 30. Cross members 26 extend across the conveyor from posts on opposite sides thereof and mount and support the leak-detecting apparatus 10. A plurality of dual acting (air driven in both directions) air cylinders 28 positioned on the cross members 26 are utilized to move the leak detecting assembly 30 downwardly and to return the assembly to its upper position.

The leak-detecting assembly 30 includes a plate 34 which carries one or more sensing members in the form of displacement transducers 36 positioned thereon. While the invention is illustrated and described herein with a pair of sensing members 36, it is to be understood that any convenient number of such members may be utilized, subject to space and equilibration requirements. Each of the transducers has an internal spring-loaded tip 38 for contacting a bag as shown in FIG. 3c and determining the displacement of the tip. These displacement transducers can be DC-DC gauging transducers of the type sold by Trans-Tek, Inc. of Ellington, Conn., Model 354-000 and are used to measure the rate of displacement of tip 38 of each transducer 36 when the air cylinders 28 have driven the plate 34 to its lowermost position and held it in such position.

A shutter assembly 39 is positioned in advance of the leak-detecting assembly 30. A cross member 40 positioned between posts 24 supports this shutter assembly 39. A shutter member 46 is activated by a dualacting air cylinder 42 and also has guide rods 52. The shutter 46 when activated by the cylinder 42 moves downwardly to contact a leading portion of the bag and expand the rest of the bag as shown in FIGS. 3B and 3C.

A pair of straps 51 are mounted to move vertically relative to plate 34 on guide rods 52 and are biased downwardly by springs 50. These straps 51 work in a similar fashion to shutter 46 in that they cause further fluffing of the bag and force the back seal BS open if it has a leak, see FIG. 4.

For a description of the method please refer to FIGS. 2–4. There are provided a plurality of bags to be tested, the bags being filled with product and gas and being of a material such as plastic. A typical example of such bag would be potato chip or other snack food bags such as manufactured by Frito-Lay, Inc., assignee of this invention. These bags are automatically positioned (by means not shown) on the conveyor belt 16 between the the flights 18 thereof and the conveyor belt moves intermittently to position a bag B underneath the plate 34. This is the position shown in FIG. 3A.

The first step is to fluff the bag by compressing at least one end of the bag to put additional pressure on the gaseous contents of the bag. This is accomplished by utilizing the pressing shutter 46 which is driven by air cylinder 42 into the position of FIG. 3B causing the main body of the bag to fluff upwardly as shown in FIG. 3B. The next step is the activation of air cylinders 28 to move the plate 34 downwardly as shown in FIG. 3C This causes the tips 38 of the displacement transducers 36 to contact the bag. When the tips 38 contact the fluffed bag they are displaced vertically in an upward direction.

This displacement is illustrated graphically in FIG. 2A with vertical displacement plotted against time. The upward movement of displacement transducer tips 38 is leg a of the graph. The displacement measured in leg a indicates that the transducer tips 38 have been forced upwardly by the bag B. The air cylinders continue to hold the plate 34 down. After a predetermined short time the air cylinders 28 pull the plate 34 back and the transducer tips 38 return to their original position. The time the plate 34 is held down is the portion b in FIG. 2A and the return of the transducer tips 38 is portion c of FIG. 2A.

Assume that there is a leak in the bag B being tested and that the leak could be in either the back seal, the end seals or any other place in the surface of the bag material. The leaking condition is indicated by the time/displacement graph shown in FIG. 2B. Again the transducer tip 38 as it is moved upwardly indicates its movement against the surface of the bag on leg a'. After each of the transducers 36 has reached the maximum position as shown in FIG. 3C, the plate 34 is held steady in the down position for the predetermined period of time, but because of the leak in the bag there is movement of the transducer tips 38. That is, a leaky bag will allow the transducer tips 38 to move downward gradually as the bag loses air. Leg b' of the time/displacement plot in FIG. 2B indicates such movement. After a predetermined length of time the transducer tips 38 are returned by their internal springs as air cylinders 28 return plate 34 to its uppermost position. Leg c' of the displacement plot indicates such movement. A comparison of the slope of leg b' with the relatively flat slope of leg b (indicative of a nonleaking bag) by using a programmable controller 60 (illustrated schematically in FIG. 1) utilizes the difference in slopes to indicate whether the bag being tested is faulty. The greater the slope of leg b' the larger the leak in the bag. If the leak, as measured by the slope of leg b', is greater than that allowable, such bag can be removed downstream of the detector by suitable rejection means not shown. In practice the detection time (the length of leg b of the graph) is 100–200 milliseconds, and the programmable controller is a Giddings & Lewis Model 409 with a data acquisition module which accepts voltage signals from the transducers. In practice, it has been found that for certain bags and certain applications, a voltage difference from one end of leg b to the other end of leg b as small as about 0.02 volts in 100 milliseconds indicates that the bag has a leak large enough to require rejection.

If a sufficiently large leak exists in the bag, usually the result of a portion of the seal area being unsealed, the bag does not fluff as a result of the compression by shutter 46. Therefore, the tips 38 do not meet any resistance provided by the fluffed bag and are not displaced vertically in an upward direction, resulting in no indication as represented by leg a of the graph. As a result, there will be no legs a or c, and the controller can be programmed to reject such bags.

Bags may have what are referred to as "pinhole" leaks, leaks so small that appreciable air movement into or out of the bag does not occur. If these pinholes are small enough (generally less than about 1 mm), the variation of displacement observed by tips 38 will be small enough (and the slope of leg b' will be flat enough) that the bag will not be rejected. Therefore, even though the slope of leg b' may not be absolutely flat, the controller will be programmed to accept a certain level of leaking without rejecting the bag.

As shown in FIG. 4 the tips 38 of the displacement transducers 36 are positioned at the transverse center line of the bag B so that they do not contact the back seal BS of the bag during operation of the detector.

Utilizing the principles of this invention slits or leaks as short as one centimeter can be detected in bags moving at the rate of 50 bags per minute. Smaller holes could be detected at lower rates. The invention allows every bag to be inspected prior to getting to a case packer whether that packer is human or mechanical. Temporary storage allows a decision to be made as to whether to accept or reject the bag being tested.

After a bag is detected to have a leak it can be automatically rejected, e.g., removing it automatically from the conveyor 16 after the conveyor moves its next step or so.

The sequential operation of the gear cylinder and the stepping conveyor can be operated manually. However, a preferred form would be automatic. In either case the stepping conveyor would first position the bag, when the bag is in position the air cylinder 42 would operate pressing the pressing shutter 46 into the bag to fluff it, then the air cylinders 28 would operate forcing the transducer tips 38 in contact with the bag for the predetermined time during which the output of the transducers are read and then the air cylinders 28 and 42 return to their original positions and the conveyor steps again. The circuits for accomplishing this are well within the scope of one of ordinary skill in the art.

Variations within the scope of those skilled in the art are apparent and it is the intention to be limited only as defined by the scope of the appended claims.

We claim:
1. An in line apparatus for detecting the presence or absence of holes in sealed plastic bags filled with product and gas, the apparatus comprising:
    (a) a sensing member carrier carrying one or more displaceable sensing members;
    (b) means for positioning a filled and sealed bag to be inspected accurately with respect to the sensing members;
    (c) fluffing means for contacting the bag and applying positive pressure to the bag;
    (d) means for moving the sensing member carrier towards a surface of the bag to a predetermined position to place the sensing members in contact with the bag under uniform pressure for a predetermined time;
    (e) means for detecting the amount of displacement of the sensing members upon movement of the carrier to said predetermined position so as to provide a test value for said amount of displacement, the detecting means further detecting change in displacement over time of the sensing members over a predetermined period of time while the sensing member carrier is at said predetermined position so as to provide a test value for said change of displacement over time; and
    (f) means for comparing the test value for the amount of displacement and the test value for the change in displacement over time of the sensing members to predetermined corresponding values obtained with control bags, the comparing means being programmed to reject bags with which the sensing members are displaced less than a predetermined amount, said comparing means further being programmed to reject bags with which the change in displacement over time of the sensing members exceeds a predetermined rate.

2. Apparatus as in claim 1 wherein the means for positioning the bag comprises an indexing conveyor.

3. Apparatus as in claim 2 further comprising shutter means for fluffing the bag prior to moving the sensing members into contact with the bag.

* * * * *